United States Patent [19]
Shinriki

[11] 4,334,464
[45] Jun. 15, 1982

[54] APPARATUS FOR ENCRUSTING JAM

[75] Inventor: Tatsuo Shinriki, Chiba, Japan

[73] Assignee: Height Inc., Matsudo, Japan

[21] Appl. No.: 224,833

[22] Filed: Jan. 13, 1981

[30] Foreign Application Priority Data
   Jan. 16, 1980 [JP] Japan ................................. 55-3197

[51] Int. Cl.³ ................................................ A21C 9/00
[52] U.S. Cl. .................................. 99/450.6; 99/450.2; 99/450.7
[58] Field of Search ........................... 99/450.1–450.8, 99/440; 53/170, 586, 176, 590, 218, 228; 264/259, 171.1, 160, 163, 261, 263; 425/122, 127, 110, 256, 289, 296, 297, 404, 305.1, 324.1; 426/94, 102, 104, 502

[56] References Cited
U.S. PATENT DOCUMENTS

| 2,050,715 | 8/1936 | Malocsay | 53/176 |
| 3,611,950 | 10/1971 | Battaglia et al. | 99/450.6 |
| 4,014,254 | 3/1977 | Ohkawa | 99/450.6 |

FOREIGN PATENT DOCUMENTS

| 45-13432 | 5/1970 | Japan | 99/450.6 |
| 45-21620 | 7/1970 | Japan | 99/450.6 |

Primary Examiner—Philip R. Coe
Assistant Examiner—Timothy F. Simone
Attorney, Agent, or Firm—Wenderoth, Lind & Ponack

[57] ABSTRACT

An automatic make-up machine, in which bakery product, "ANPAN", similar to bun and its inside is filled a scaled lump or ball of jam (hereafter called "jam ball") or the like such as sweet bean paste or minced and cooked meat-green compound paste is produced by using an application of filling and encrusting method in the bakery technology.

4 Claims, 9 Drawing Figures

APPARATUS FOR ENCRUSTING JAM

BACKGROUND OF THE INVENTION

Up to the present, make-up of the said product almost depend on handiwork. Namely, in this process, we firstly make an individual round dough skin (hereafter called "dough skin") which is rolled by hand or machine, and put a jam ball on the dough skin by hand or depositing machine, and put the dough skin on the palm of the left or right hand, and reroll the edge or skirt of dough skin (hereafter called "skirt") all around by fingers of the other hand, and finally pucker up and round the dough skin together with jam ball by fingers of both hands.

Further, the product has seams at its puckered part so that we press down it by hand onto a pan while facing its seam side down. After panning, products pass onto the next steps of proofing and baking.

As mentioned above, we need much handiworks and many make-up labors for mass production. Furthermore, there is a problem that products by handiwork have a tendency to be unstable in quality and size owing to the difference of the finger skill degree among make-up labors.

Meanwhile, instead of the above handiwork, many trial applications by machines having mechanism of extruding and encrusting have been done, but unsuccessful. The reason is that, in the case of fermented bread dough, the gluten structure of the dough has a tendency to be destroyed when extruded from a narrow nozzle so that the crumb texture of products after baking becomes very weak in spite of improving recipe of dough materials or adjusting method of extrusion. Particularly, during one or two days after baking, the crumb texture rapidly becomes moistureless and is apt to tear very easily, and yet this period just coincides with the time that products are put on sale. Therefore, this is very critical in quality.

In order to solve the problem mentioned above, the inventor has been many years developing an automatic make-up machine equipped with mechanism of finger-work for not adding any harm to the bread dough and yet for mass production.

SUMMARY OF THE INVENTION

This invention relates to an automatic make-up machine composed with plural kits of finger rods to pucker products in high speed, a depositing mechanism to deposit a jam ball on a dough skin and a wafer-film feeding mechanism to supply a sheet of water-film covering a jam ball in order to avoid the sticky trouble occurred from the said jam ball. It is a main object of the present invention to automatically make up a large amount of ANPAN or similar one keeping long-life crumb and uniform size.

It is another object of the present invention to save make-up labors and to be able to operate the machine by a single operator.

BRIEF DESCRIPTION OF THE DRAWINGS

The structure, actions and effects of the present invention will become more apparent from the accompanying drawings.

DETAILED DESCRIPTION OF THE PREFERRED EMBODIMENT

Figure 1:
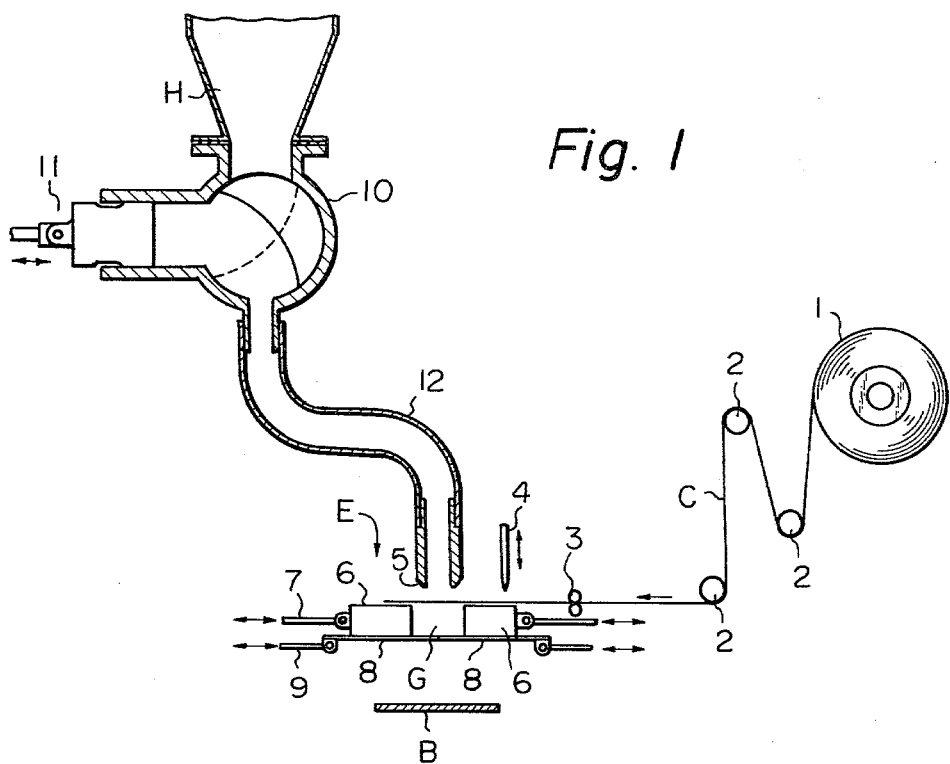
FIG. 1 is a side vertical view of a principal part of the depositor.

In FIG. 1, the jam stocked in the hopper H is pushed out by a stroke of ram 11 after scaled in the cylinder type valve and comes out as a jam ball from the nozzle 5 through the hose 12 at regular intervals. A jam ball A shown in FIG. 2 is deposited from the nozzle 5 to a sheet of wafer-film C' which completely covers the bottom surface of jam ball.

The wafer-film roll 1 unwinds and supplies its tape to the beds 6 of the primary covering mechanism for a ball paste. As soon as the tape is set on the beds 6 by the driving roller 3 through the guide roller 2, it is cut to a suitable length as a sheet of wafer-film C' by the cutter 4.

The conveyer B travels to the right direction against facing FIG. 1.

Figure 2:
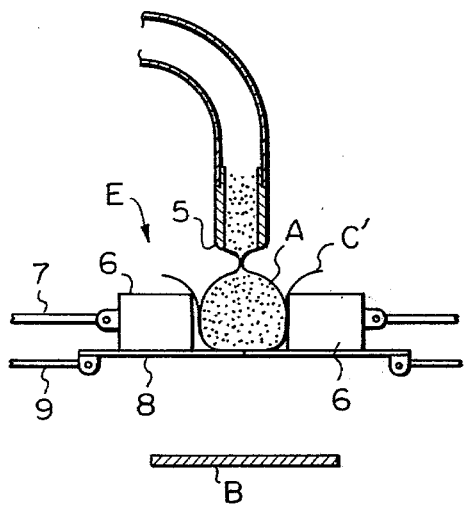
FIG. 2 is a side vertical view of the nozzle part of FIG. 1.

When a jam ball is put on a sheet of wafer-film C' stretched between both beds 6, it is held by both beds 6 and is put on the baffle plate 8 which is closing position (shown in FIG. 2).

The said beds and baffle plate are relatively opened and closed by the rods 7 and 9 to the arrow as shown in FIG. 1.

Figure 3:
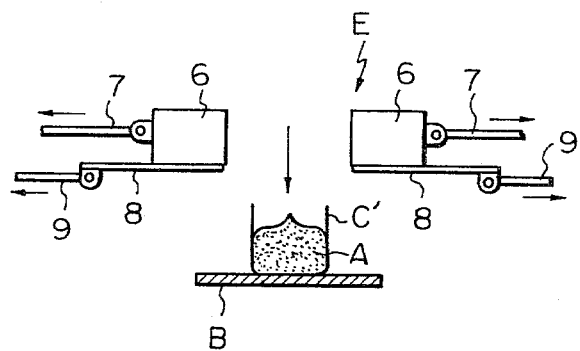
FIG. 3 is a side view of the opening position of jam ball holding mechanism.

FIG. 3 is a view of the situation that a jam ball A primitively covered with a sheet of wafer-film C' is dropped by the opening stroke of the said parts 6 and 8 onto the conveyer B. This jam ball A travels to the right direction against facing FIG. 3. In this way, a sheet of wafer-film not only protects the direct contact of the jam ball A to the conveyer surface B, but also let the jam ball keep its own form stable in the lapse of time a little.

In consequence of the travel of the conveyer B, a dough skin S rolled by the roller is shifted by the conveyer 12 over a jam ball A' (shown in FIG. 4), wherein timing between the arrival of the jam ball A' on the conveyer B and the drop of the dough skin S is synchronized.

Figure 4:
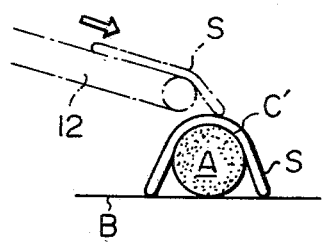
FIG. 4 is a side view of the situation of a jam ball covered with a dough skin S at the primary encrusting stage.
Figure 5A:
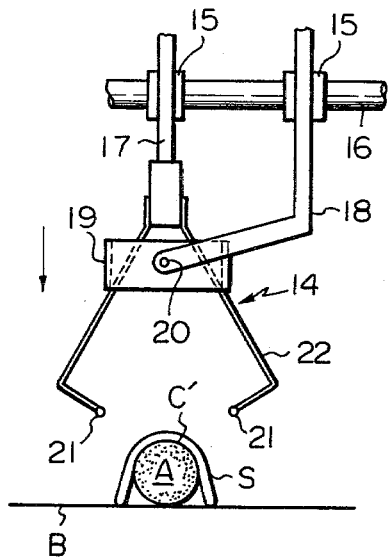
FIGS. 5a, 5b and 5c are side views of the mechanical sequence of encrusting a jam ball with a dough skin.
Figure 5B:
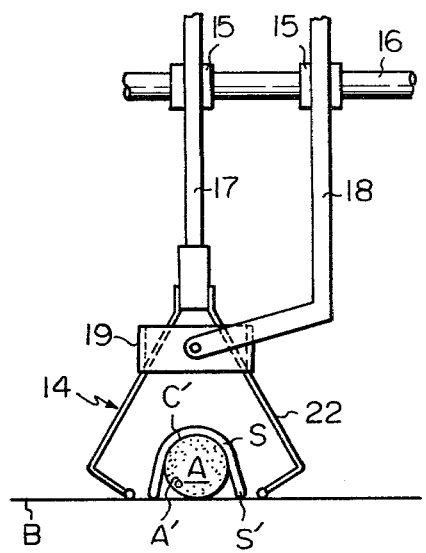

A jam ball A is covered with a dough skin S as shown in FIG. 4, FIGS. 5a and 5b, and like this, it is conveyed to the position of the finger rods encrusting mechanism 14. This is shown in the illustrations from FIGS. 5a to 5c.

The said finger rods encrusting mechanism 14 is supported with the up and down movable rod 17 built in the guide bearing 15 fitted with the support 16 and is composed with the elbow type-armrod 18, the guide ring 19 connected with the pin 20 located directly under the rod 17 and plural finger rods 22 (for example six per kit) which are elastically connected to the lower end of the rod 17 and can open and close freely to the radical directions by the operation of the guide ring 19.

Each tip of the finger rods 22 has a Teflon globular part 21 which is suitable for handling dough skin and sticky jam ball (including covered with a sheet of wafer-film).

Figure 5C:
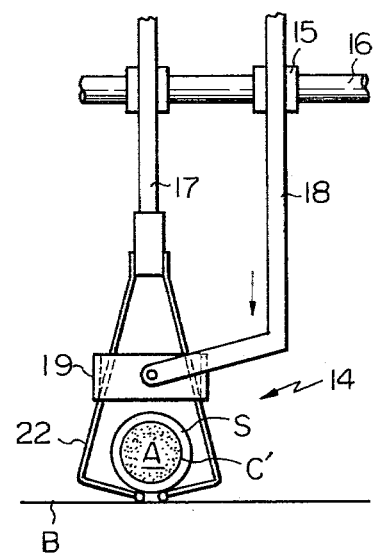

The finger rods make a closing motion when the rod 17 goes down to the fixed height and then the armrod 18 only further goes down together with the guide ring 22 (shown in FIG. 5c).

Figure 6A:
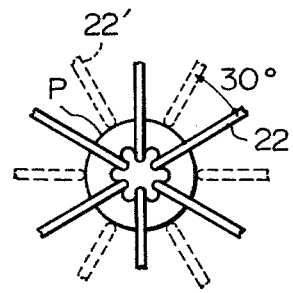
FIGS. 6a and 6b are partial planes of the closing position of the finger rods at the encrusting stage.
Figure 6B:
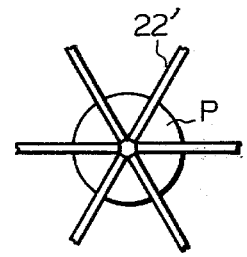

In this motion, the skirt S' of dough skin S is pushed and puckered by the finger rods 22. However, as shown in FIG. 6a, the skirt S' is not perfectly puckered in only one closing motion of the finger rods and is shaped to be petaline. Therefore, it is desirable that another six finger rods which are equally shifted 30° against the first group of finger rods 22 at the plane angle are provided to perfectly repucker the said petaline dough skin. FIG. 6b shows the bottom surface of dough skin puckered perfectly.

In the closing motion of the finger rods 22, as the bottom surface of the jam ball A encrusted with dough skin S is primitively covered with a sheet of wafer-film C', the jam ball A, especially its part A', is very smoothly acceptable to be encrusted with the skirt S' without irregular shape or distortion as shown in FIG. 5b.

Furthermore, the dough skin S except its skirt S' does not undergo any pressure by the tips of finger rods when puckering so that the gluten structure of the dough also keeps for long in ideal condition.

Therefore, this invention finds it possible to automatically make up dough products having fine gluten structure which holds moisture and gas cells in uniformity so that these products have excellent keeping qualities and a good flavor after baking.

What is claimed is:

1. An apparatus for covering jam or the like characterized by being composed of a jam ball supply section for delivering a series of jam balls or the like each in a predetermined amount on a conveyer belt, a wafer-film supply section for supplying a series of wafer-films each in a predetermined dimension beneath said jam balls, a rolled dough skin supply section for conveying and putting rolled dough skins on said jam balls on said conveyer belt, and encrusting means including a clamp mechanism for puckering skirt portions so that each of said jam balls or the like primitively stuck with said wafer-film is then encrusted in each of said rolled dough skin.

2. An apparatus as defined in claim 1, further characterized in that said wafer-film supply section is so arranged that a predetermined dimension of wafer-film unwound from a wafer-film roll is cut, and that each of said wafer-films is stuck to each of said jam balls or the like.

3. An apparatus as defined in claim 1 or 2, further characterized in that a primary covering mechanism is provided at the extremities of said wafer-film supply section and said jam ball supply section to temporarily hold said wafer-films and said jam balls individually to thus prepare said jam balls or the like primitively covered with said wafer-films.

4. An apparatus as defined in claim 3, further characterized in that said primary covering mechanism is provided with baffle plates adapted to be relatively open and closed, said conveyor belt being arranged downwardly of said baffle plates.

* * * * *